United States Patent [19]
Ito et al.

[11] Patent Number: 6,114,776
[45] Date of Patent: Sep. 5, 2000

[54] VEHICLE-EQUIPMENT CONTROL APPARATUS

[75] Inventors: Susumu Ito; Tatsuya Yokoyama; Hiroyuki Sato, all of Miyagi-ken, Japan

[73] Assignee: Alps Electric Co., Ltd., Tokyo, Japan

[21] Appl. No.: 09/208,150

[22] Filed: Dec. 9, 1998

[30] Foreign Application Priority Data

Dec. 22, 1997 [JP] Japan .................................. 9-353154

[51] Int. Cl.⁷ ...................................................... B60L 1/00
[52] U.S. Cl. ............................................. 307/10.1; 307/9.1
[58] Field of Search ..................................... 307/9.1, 10.1; 361/115; 324/76.63; 700/100; 455/346

[56] References Cited

U.S. PATENT DOCUMENTS 5,990,571 11/1999 Sato et al. ................................ 307/10.1

*Primary Examiner*—Stephen W. Jackson
*Assistant Examiner*—Sharon Polk
*Attorney, Agent, or Firm*—Brinks Hofer Gilson & Lione

[57] ABSTRACT

A vehicle-equipment control apparatus comprises a plurality of types of control instruction units respectively having different switch functions and incorporating different diode-connected circuits therein, unit mounting portions to which the plurality of types of control instruction units are mountable, and a control instruction unit determinator which, when any of the plurality of types of control instruction units is fit to the unit mounting portions, determines the type of the fit control instruction unit based on the output of each built-in diode-connected circuit. In this case, the diode-connected circuit is made up of two or more diodes or comprised of two or more diodes and one resistor.

2 Claims, 4 Drawing Sheets

VEHICLE-EQUIPMENT CONTROL APPARATUS

BACKGROUND OF THE INVENTION

1. Field of the Invention

The present invention relates to a vehicle-equipment control apparatus, and particularly to a vehicle-equipment control apparatus of a type wherein when an arbitrary control instruction unit of a plurality of types of control instruction units having different switch functions is fit to a switch mounting portion of a control device, the type of a switch function of the fit control instruction unit can be automatically determined.

2. Description of the Related Art

A plurality of manually-operated switches for controlling and adjusting air conditioning in a vehicle room are conventionally placed on a panel surface of a vehicle instrument panel. Any of the plurality of switches is selectively operated to thereby switch the air conditioning in the vehicle room to a cooled or heated state or the like or increase and decrease the temperature at cooling or heating.

However, according to user demands, ones wherein switch built-in portions allowing the mounting of a plurality of optional manually-operated switches as an alternative to the plurality of manually-operated switches for controlling and adjusting the air conditioning in the vehicle room are provided on a panel of an instrument panel, i.e., switch devices having unit mounting portions to which a plurality of types of control instruction units are respectively attachable and wherein one or a plurality of control instruction units different in type for achieving functions desired by a user, e.g., functions such as a headlight optical-axis adjustment, fog-lamp lighting control, the opening of a trunk, etc. are mounted to the unit mounting portions, and switching between the mounted control instruction units is performed to thereby make it possible to cope with user's options, have been recently proposed.

In this case, the proposed switch devices are those wherein any type of control instruction units are attachable to the unit mounting portions and even if any type of control instruction units are fit to the unit mounting portions, the functions of the fit control instruction units can be achieved by performing switching between the fit control instruction units under the processing of switching signals outputted from the control instruction units by a controller (CPU) of a control apparatus or device.

Of such types of known switch devices, a vehicle-equipment control apparatus provided with the function of automatically determining, when control instruction units are respectively mounted to unit mounting portions, the mounted control instruction units, has been also proposed.

The proposed switch device comprises a plurality of types of control instruction units, a control device for selectively mounting these control instruction units to unit mounting portions, and at least one control circuit unit incorporated in the control device. Recognition signal generating means for generating recognition signals peculiar to the control instruction units is provided on the control instruction units side. Further, a switch determination circuit for receiving each recognition signal therein and generating a signal for driving a predetermined load is provided on the control circuit unit side. In this case, the recognition signal generating means has internal interconnections or wires different from one another every control instruction units and outputs different recognition signals (switch signals) when the switches of the control instruction units are operated (turned on). Further, the switch determination circuit has a plurality of logical circuits, a plurality of input terminals and a plurality of output terminals. When a recognition signal (switch signal) is supplied to any of the plurality of input terminals from the corresponding mounted control instruction unit, the switch determination circuit generates a driving signal supplied to a load corresponding to the function of each control instruction unit fit to any output terminal according to the signal-supplied input terminal and the polarity of the recognition signal (switch signal) or the like.

According to the proposed switch device, when a desired type of control instruction unit is attached to a unit mounting portion of the control circuit unit and the switch of the control instruction unit is turned on, a recognition signal peculiar to the function of the control instruction unit is generated from the control instruction unit and supplied to the switch determination circuit of the control circuit unit, whereby the type of the attached control instruction unit is determined based on the recognition signal received by the switch determination circuit. Thus, the switch device can automatically determine the control instruction units having various functions by simply replacing the control instruction units attached to the unit mounting portions with others and is capable of executing operations corresponding to the functions of the control instruction units.

While the above-mentioned switch device can automatically determine the control instruction units having the various functions by simply mounting the control instruction units to the unit mounting portions of the control circuit unit and execute the operations corresponding to the functions of the control instruction units, the different internal wires including the switches must be provided on the control instruction units sides every types of control instruction units to determine the functions of the control instruction units, and the switch determination circuit having the plurality of logical circuits, the plurality of input terminals and the plurality of output terminals must be provided on the control circuit unit side.

From the viewpoint of these, the above-mentioned switch device has a problem in that the means for determining the control instruction units is complex and the control circuit unit spontaneously increases in manufacturing cost and a limitation is spontaneously imposed on the combination of the logical circuits in the switch determination circuit, whereby the control instruction units cannot be increased in kind.

In order to cope with such a problem, a vehicle-equipment control apparatus capable of determining the functions of control instruction units provided with switches, variable resistors, etc. with a very simple configuration without increasing the manufacturing cost has been proposed by the same applicant as one for the present invention. This has already been filed as U.S. Pat. No. 5,990,571 and EP 97110430.2.

The vehicle-equipment control apparatus described in U.S. Pat. No. 5,990,571 and EP 97110430.2 is one wherein resistive elements are principally used within the control instruction units to fractionally divide analog voltages inputted to the control instruction units, and the resultant divided outputs of analog voltages are analog-to-digital converted into digital form, after which they are processed by a CPU (controller).

Thus, the vehicle-equipment control apparatus described in U.S. patent Ser. No. 08/880,119 and EP 97110430.2 is accompanied by a problem to be newly solved that a processing speed cannot be quite made fast because time is spent in analog-to-digital conversion and it is difficult to obtain high reliability due to noise overlapped at an analog voltage circuit portion, for example.

SUMMARY OF THE INVENTION

The present invention has been made to solve these problems. Therefore, an object of this invention is to provide a vehicle-equipment control apparatus which performs determination as to the function of each control instruction unit by a simple configuration without an increase in manufacturing cost and which is fast in processing speed and has high reliability.

In order to achieve the above object, a vehicle-equipment control apparatus according to the present invention is provided with means for allowing diode-connected circuits indicative of the functions and types of control instruction units to be incorporated and placed in the control instruction units sides and allowing a control instruction unit determinator for determining the type or classification of the mounted control instruction unit, based on the output of the diode-connected circuit of each mounted control instruction unit to be disposed on the control apparatus side.

According to the means described above, the functions of the control instruction units are discriminated from one another by using the diode-connected circuits respectively corresponding to the functions and types of the control instruction units incorporated into and placed in the control instruction units sides and the control instruction unit determinator for determining the types of the control instruction units based on the outputs of the diode-connected circuits of the mounted control instruction units placed on the control apparatus side. The diode-connected circuits are simply provided on the control instruction units sides and the outputs of the diode-connected circuits are merely determined on the control apparatus side. Therefore, the control instruction units are simple in their circuit design, and they make no use of incorrect devices and are not miswired upon their assembly. Since digital processing can be used to make determination as to the output of each diode-connected circuit, a determining process becomes fast and a determining process resistant to noise can be performed.

Vehicle-equipment control apparatuses according to embodiments of the present invention respectively have different switch functions, and are respectively provided with a plurality of classes or types of control instruction units with different diode-connected circuits incorporated therein, unit mounting portions to which the plurality of types of control instruction units are attachable, and a control instruction unit determinator for determining, when any of the plurality of types of control instruction units is mounted to the unit mounting portions, the type of the mounted control instruction unit, based on outputs produced from the built-in diode-connected circuits.

In the preferred one of the embodiments according to the present invention, a vehicle-equipment control apparatus includes diode-connected circuits each of which comprises two or more diodes.

In another preferred one of the embodiments according to the present invention, a vehicle-equipment control apparatus includes diode-connected circuits each of which comprises two or more diodes and one resistor.

According to these embodiments of the present invention, the diode-connected circuits indicating the functions and types of the control instruction units are respectively incorporated and placed in the control instruction units sides.

Further, the control instruction unit determinator for determining the type or classification of each mounted control instruction unit, based on the output of the diode-connected circuit of each mounted control instruction unit is disposed on the control apparatus side. The difference between the outputs of the diode-connected circuits is determined based on the difference between the configurations of the diode-connected circuits lying within the control instruction units, whereby the type or classification of each mounted control instruction unit is determined. Therefore, the design of the circuit in each control instruction unit becomes simple and hence the control instruction unit makes no use of incorrect devices and is not miswired upon its assembly. Since digital processing means is principally used to make determination as to the output of each diode-connected circuit, and it is practically unnecessary to perform analog-to-digital conversion, the speed for processing its decision becomes fast and a noise-resistant determining process can be performed.

Since, in this case, the digital processing can be used in all the decisions as to the outputs of the diode-connected circuits when the diode-connected circuits are respectively made up of two or more diodes, the processing speed for each decision is fast and a noise-resistant determining process can be carried out.

When each diode-connected circuit comprises two or more diodes and one resistor and the resistance value of the resistor is selected according to the type of control instruction unit, analog processing is used only for determination of the resistance value thereof. Therefore, the processing speed for its decision is slightly slow and the resistance to noise is slightly lowered, as compared with the aforementioned example. However, as compared with U.S. patent Ser. No. 08/880,119 and EP 97110430.2 proposed previously, the processing speed for determination is fast and the resistance to noise is also increased. Besides, the type of control instruction unit can be extremely diversified by selecting the resistance value of each resistor.

DETAILED DESCRIPTION OF THE PREFERRED EMBODIMENTS

Embodiments of the present invention will hereinafter be described with reference to the accompanying drawings.

Figure 1:
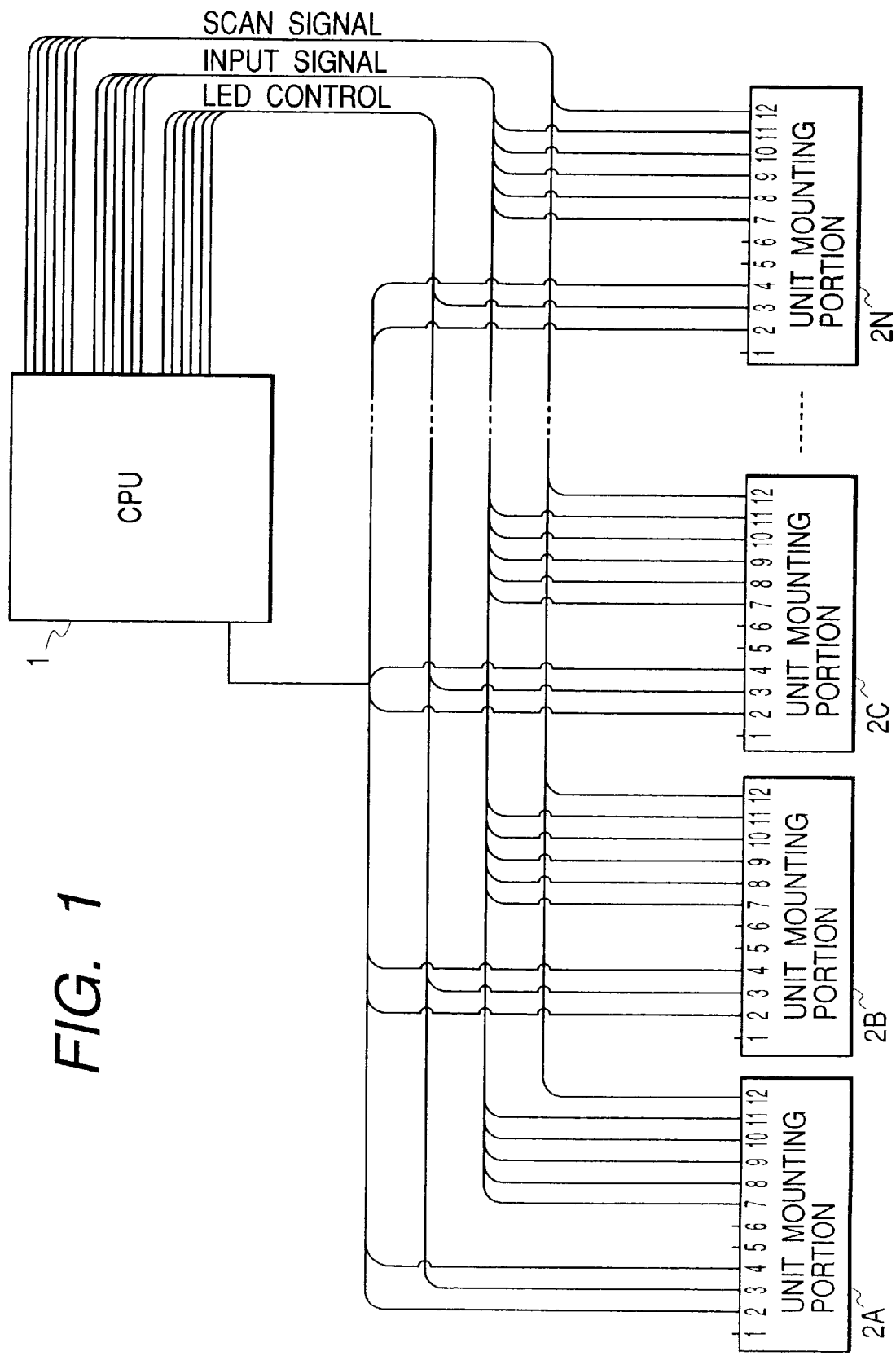
FIG. 1 is a block diagram showing a principal configurational portion of a first embodiment of a vehicle-equipment control apparatus according to the present invention.

FIG. 1 is a block diagram showing a principal configurational portion of a first embodiment of a vehicle-equipment control apparatus according to the present invention. FIGS. 2A through 2D are respectively diagrams showing internal configurations of various control instruction units employed in the vehicle-equipment control apparatus according to the first embodiment.

As shown in FIG. 1 and FIGS. 2A through 2D, the vehicle-equipment control apparatus according to the first embodiment includes a controller (CPU, control instruction unit determinator) 1, a plurality of (N) unit mounting portions 2A, 2B, 2C, . . . , 2N, and control instruction units 4A, 4B, 4C and 4D.

The respective control instruction units 4A, 4B, 4C and 4D are shaped in the form of a longitudinal box and are provided with operating parts on the front sides thereof and 12 pin-receiving terminals comprising Nos. 1 through 12 on the rear sides thereof. When any of the control instruction units 4A, 4B, 4C and 4D is now mounted to the unit mounting portions 2A, 2B, 2C, . . . , 2N, for example, the control instruction unit 4A is fit to the unit mounting portion 2A, pins Nos. 1 through 12 attached to the unit mounting portion 2A are inserted into their corresponding twelve pins-receiving terminals Nos. 1 through 12 attached to the control instruction unit 4A. This is similar even to the case where any of the control instruction units 4A through 4D is inserted into other unit mounting portions 2B through 2N.

As shown in FIG. 1, the pins Nos. 2 and 4 of the respective unit mounting portions 2A through 2N are respectively electrically connected to a power output terminal of the controller 1 through a power supply bundle line. The pins Nos. 3 thereof are respectively electrically connected to light-emitting diode control terminals through a light-emitting diode (LED) control bundle line of the controller 1. The pins Nos. 7 through 11 thereof are respectively electrically connected to decision signal input terminals of the controller 1 through an input signal bundle line and the pins Nos. 12 thereof are respectively electrically connected to scan signal output terminals of the controller 1 through a scan signal bundle line.

Figure 2A:
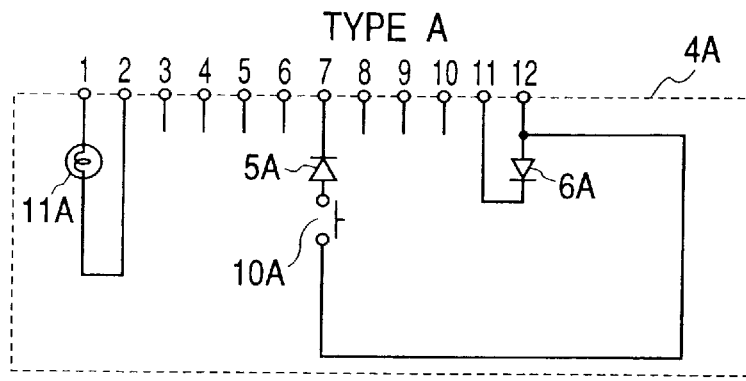
FIGS. 2A to 2D are diagrams showing internal configurations of various control instruction units employed in the vehicle-equipment control apparatus according to the first embodiment.

In the control instruction unit 4A as shown in FIG. 2A, a display lamp 11A is electrically connected between the pin-receiving terminal No. 1 and the pin-receiving terminal No. 2, a diode 5A and a push button switch 10A are series-connected between the pin-receiving terminal No. 7 and the pin-receiving terminal No. 12, and a diode 6A is electrically connected between the pin-receiving terminal No. 11 and the pin-receiving terminal No. 12. Further, the pin-receiving terminals Nos. 3 through 6 and the pin-receiving terminals Nos. 8 through 10 are all open.

Figure 2B:
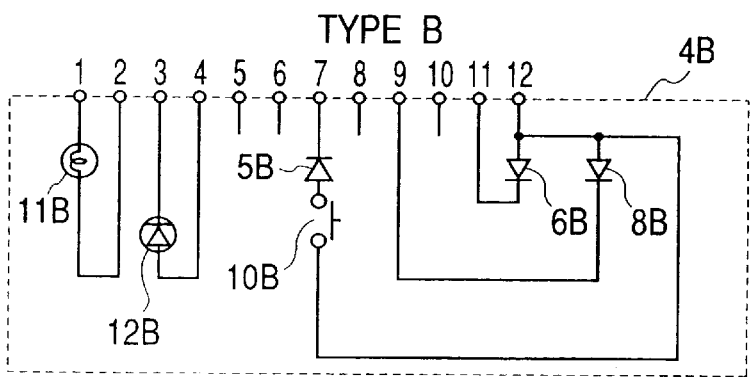

In the control instruction unit 4B as shown in FIG. 2B, a display lamp 11B is electrically connected between the pin-receiving terminal No. 1 and the pin-receiving terminal No. 2, and a light-emitting diode 12B is electrically connected between the pin-receiving terminal No. 3 and the pin-receiving terminal No. 4. A diode 5B and a push button switch 10B are series-connected between the pin-receiving terminal No. 7 and the pin-receiving terminal No. 12, a diode 6B is electrically connected between the pin-receiving terminal No. 11 and the pin-receiving terminal No. 12, and a diode 8B is electrically connected between the pin-receiving terminal No. 9 and the pin-receiving terminal No. 12. Further, the respective pin-receiving terminals Nos. 5, 6, 8 and 10 are all open.

Figure 2C:
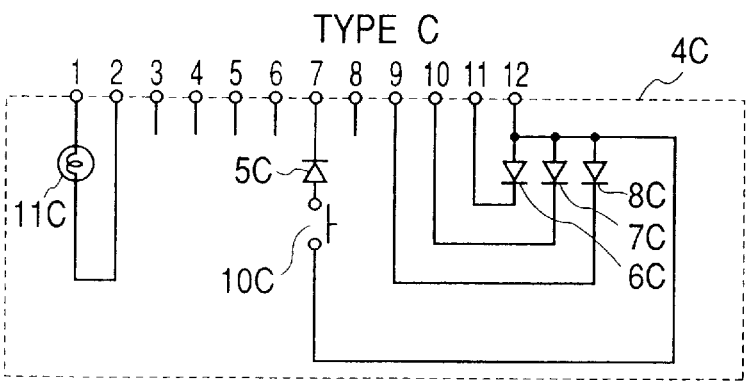

In the control instruction unit 4C as shown in FIG. 2C, a display lamp 11C is electrically connected between the pin-receiving terminal No. 1 and the pin-receiving terminal No. 2, and a diode 5C and a push button switch 10C are series-connected between the pin-receiving terminal No. 7 and the pin-receiving terminal No. 12. A diode 6C is electrically connected between the pin-receiving terminal No. 11 and the pin-receiving terminal No. 12, a diode 7C is electrically connected between the pin-receiving terminal No. 10 and the pin-receiving terminal No. 12, and a diode 8C is electrically connected between the pin-receiving terminal No. 9 and the pin-receiving terminal No. 12. Further, the pin-receiving terminals Nos. 3 through 6 and the pin-receiving terminal No. 8 are all open.

Figure 2D:
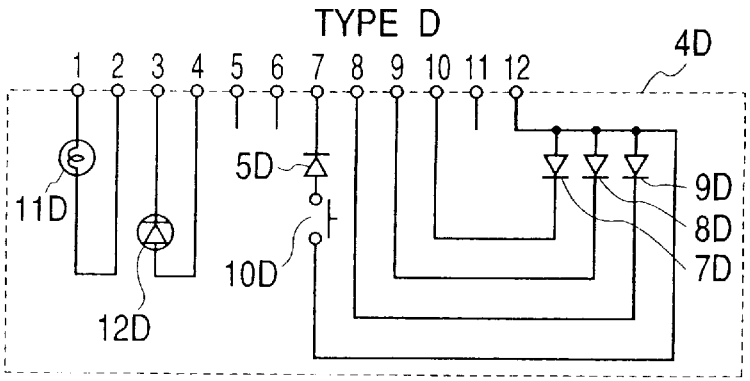

In the control instruction unit 4D as shown in FIG. 2D, a display lamp 11D is electrically connected between the pin-receiving terminal No. 1 and the pin-receiving terminal No. 2, and a light-emitting diode 12D is electrically connected between the pin-receiving terminal No. 3 and the pin-receiving terminal No. 4. A diode 5D and a push button switch 10D are series-connected between the pin-receiving terminal No. 7 and the pin-receiving terminal No. 12, and a diode 7D is electrically connected between the pin-receiving terminal No. 10 and the pin-receiving terminal No. 12. A diode 8D is electrically connected between the pin-receiving terminal No. 9 and the pin-receiving terminal No. 12, and a diode 9D is electrically connected between the pin-receiving terminal No. 8 and the pin-receiving terminal No. 12. The respective pin-receiving terminals Nos. 5, 6 and 11 are all open.

The respective control instruction units 4A through 4D respectively change the numbers and placement of diodes connected between the pin-receiving terminals Nos. 8 through 11 and the pin-receiving terminals Nos. 12 every control instruction units 4A through 4D to identify the control instruction units 4A through 4D. The control instruction unit 4A is identified by the diode 6A electrically connected to the pin-receiving terminal No. 11, the control instruction unit 4B is identified by the diode 6B electrically connected to the pin-receiving terminal No. 11 and the diode 8B electrically connected to the pin-receiving terminal No. 9, the control instruction unit 4C is identified by the diode 6C electrically connected to the pin-receiving terminal No. 11, the diode 7C electrically connected to the pin-receiving terminal No. 10 and the diode 8C electrically connected to the pin-receiving terminal No. 9, and the control instruction unit 4D is identified by the diode 7D electrically connected to the pin-receiving terminal No. 10, the diode 8D electrically connected to the pin-receiving terminal No. 9 and the diode 9D electrically connected to the pin-receiving terminal No. 8, respectively.

Operations of the vehicle-equipment control apparatus according to the first embodiment, which is constructed as described above, will be described using FIG. 1 and FIGS. 2A through 2D as follows.

When a scan signal for scanning the unit mounting portion 2A is supplied to the pin No. 12 from the controller 1 where, for example, the control instruction unit 4A of the control instruction units 4A through 4D is mounted to the unit mounting portion 2A, the scan signal is supplied to the pin-receiving terminal No. 12 of the mounted control instruction unit 4A. Next, the scan signal is supplied to the pin-receiving terminal No. 11 through the diode 6A electrically connected between the pin-receiving terminal No. 12 and the pin-receiving terminal No. 11. Further, the scan signal is supplied from the pin No. 11 of the unit mounting portion 2A to the corresponding decision signal input terminal of the controller 1 through the input signal bundle line as a decision signal.

Similarly, when a scan signal for scanning the unit mounting portion 2B is supplied to the pin No. 12 from the controller 1 where one of the other control instruction units 4B through 4D, e.g., the control instruction unit 4B is mounted or fit to the unit mounting portion 2B, the scan signal is supplied to the pin-receiving terminal No. 12 of the mounted control instruction unit 4B and thereafter transmitted to the pin-receiving terminal No. 11 through the diode 6B connected between the pin-receiving terminal No. 12 and the pin-receiving terminal No. 11. Simultaneously, the scan signal is transmitted to the pin-receiving terminal No. 9 through the diode 8B electrically connected between the pin-receiving terminal No. 12 and the pin-receiving terminal No. 9 and thereafter supplied from the pins Nos. 11 and 9 of the unit mounting portion 2B to the decision signal input terminals of the controller 1 through the input signal bundle line as a decision signal.

Further, when a scan signal for scanning the unit mounting portion 2C is supplied to the pin No. 12 from the controller 1 in the same manner as described above even where other control instruction unit 4C or 4D, e.g., the control instruction unit 4C is fit to the unit mounting portion 2C, the scan signal is supplied to the pin-receiving terminal No. 12 of the mounted control instruction unit 4C and thereafter transmitted to the pin-receiving terminal No. 11 through the diode 6C electrically connected between the pin-receiving terminal No. 12 and the pin-receiving terminal No. 11. Simultaneously, the scan signal is transmitted to the pin-receiving terminal No. 10 through the diode 7C electrically connected between the pin-receiving terminal No. 12 and the pin-receiving terminal No. 10 and to the pin-receiving terminal No. 9 through the diode 8C electrically connected between the pin-receiving terminal No. 12 and the pin-receiving terminal No. 9, respectively. Further, the scan signal is supplied from the pins Nos. 11, 10 and 9 of the unit mounting portion 2C to the decision signal input terminals of the controller 1 through the input signal bundle line as a decision signal.

When a scan signal for scanning the unit mounting portion 2N is supplied to the pin No. 12 from the controller 1 in the same manner as described above even where another control instruction unit 4D is fit to the unit mounting portion 2N, the scan signal is supplied to the pin-receiving terminal No. 12 of the mounted control instruction unit 4D and thereafter transmitted to the pin-receiving terminal No. 11 through the diode 6D electrically connected between the pin-receiving terminal No. 12 and the pin-receiving terminal No. 11. Simultaneously, the scan signal is transmitted to the pin-receiving terminal No. 9 through the diode 8D electrically connected between the pin-receiving terminal No. 12 and the pin-receiving terminal No. 9 and to the pin-receiving terminal No. 8 through the diode 9D electrically connected between the pin-receiving terminal No. 12 and the pin-receiving terminal No. 8, respectively. Further, the scan signal is supplied from the pins Nos. 11, 9 and 8 of the unit mounting portion 2N to the decision signal input terminals of the controller 1 through the input signal bundle line as a decision signal.

In this case, the processing operation is just the same as above even when other kinds of control instruction units 4A through 4D are attached to the unit mounting portions 2A through 2N respectively. The decision signals corresponding to the attached control instruction units 4A through 4D are respectively supplied to the decision signal input terminals of the controller 1 through the input signal bundle line.

When the controller 1 individually scans the unit mounting portions 2A through 2N, it determines the mounted control instruction unit as the control instruction unit 4A if the decision signals supplied from the scanned unit mounting portions 2A through 2D to the decision signal input terminals through the input signal bundle line correspond to ones supplied from the pins Nos. 11 alone. If they are found to be ones supplied from the pins Nos. 11 and 9, then the controller 1 determines that the mounted control instruction unit corresponds to the control instruction unit 4B. If they are found to be ones supplied from the pins Nos. 11, 10 and 9, then the controller 1 determines that the mounted control instruction unit corresponds to the control instruction unit 4C. If they are found to be ones supplied from the pins Nos. 11, 9 and 8, then the controller 1 determines the mounted control instruction unit as the control instruction unit 4D.

In this case, the push button switches 10A through 10D are used to execute decisions as to the types of their corresponding control instruction units 4A, 4B, 4C and 4D when closed.

According to the first embodiment as described above, if the desired control instruction units 4A through 4D are respectively connected to the unit mounting portions 2A through 2N, identification can immediately be made as to whether the control instruction units 4A through 4D mounted to the unit mounting portions 2A through 2N correspond to any of a plurality of types of control instruction units 4A through 4D, by determining, when the unit mounting portions 2A through 2N are scanned, from which pin numbers of the scanned unit mounting portions 2A through 2N the decision signals are supplied.

Since all the identification as to the plurality of types of control instruction units 4A through 4D are performed by the digital method using the decision signals in the first embodiment, the processing speed at the decision of the control instruction units 4A through 4D can be made fast by a rate at which analog-to-digital conversion is not performed on each decision signal, as compared with the previously-proposed vehicle-equipment control apparatus. Further, a circuit resistant to noise can be configured. Moreover, since the control instruction units 4A through 4D use the diode-connected circuits using the diodes alone for determining portions, the control instruction units 4A through 4D become simple in their circuit design and hence and hence they makes no use of incorrect devices and are not miswired upon their assembly.

Figure 3:
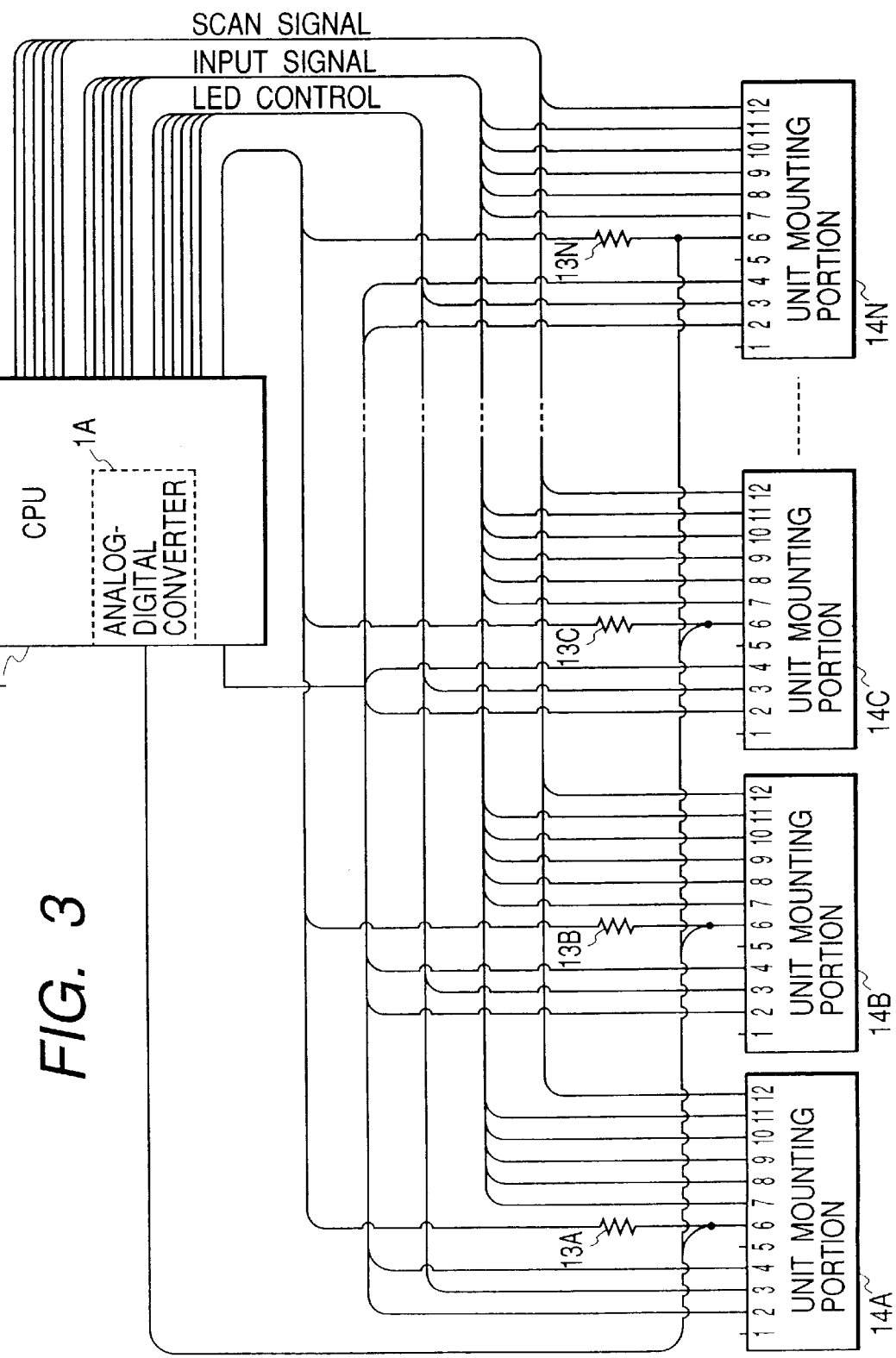
FIG. 3 is a block diagram illustrating a principal configurational portion of a second embodiment of a vehicle-equipment control apparatus according to the present invention.
Figure 4A:
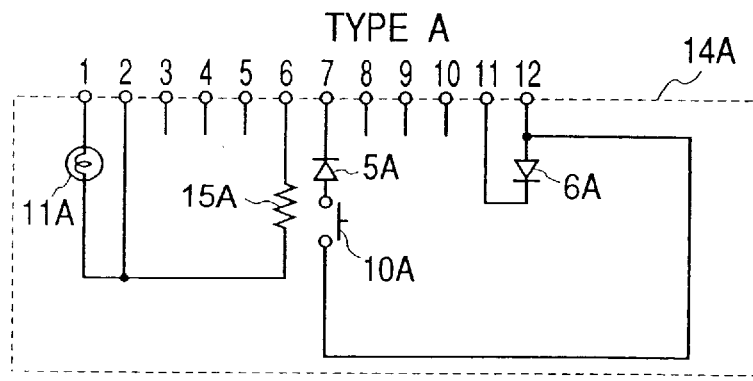
FIGS. 4A to 4D are diagrams showing internal configurations of various control instruction units employed in the vehicle-equipment control apparatus according to the second embodiment.
Figure 4B:
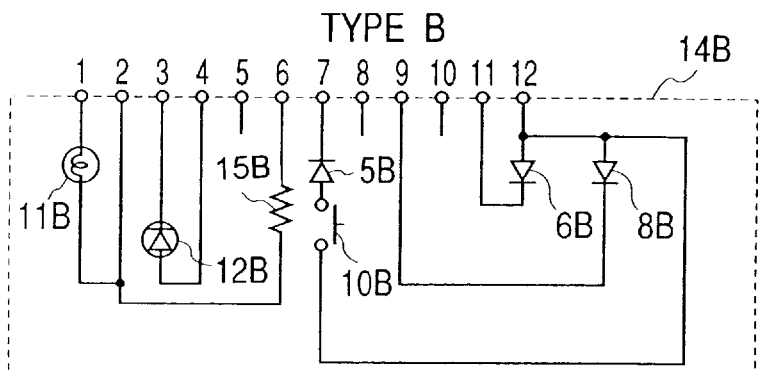
Figure 4C:
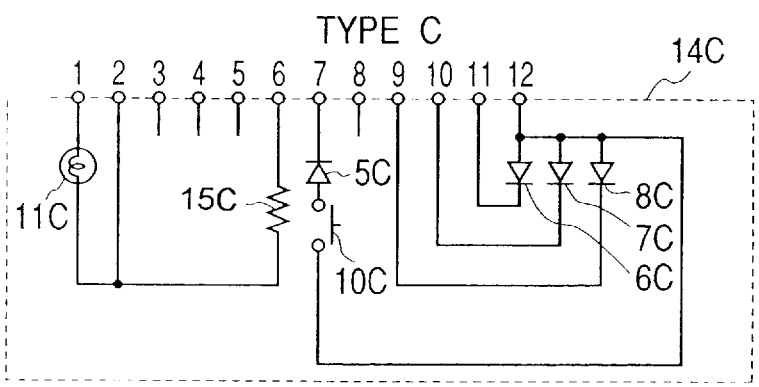
Figure 4D:
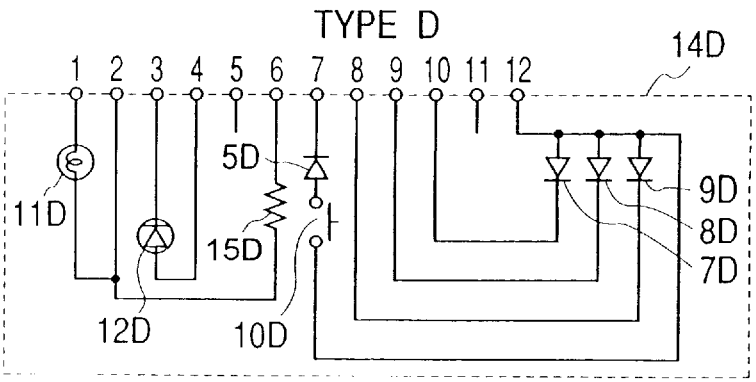

Next, FIG. 3 is a block diagram showing a principal configurational portion of a second embodiment of a vehicle-equipment control apparatus according to the present invention. FIGS. 4A through 4D are respectively diagrams showing internal configurations of various control instruction units employed in the vehicle-equipment control apparatus according to the first embodiment.

As shown in FIG. 3, the vehicle-equipment control apparatus according to the second embodiment is one wherein in the vehicle-equipment control apparatus according to the first embodiment, an analog-to-digital converter 1A is additionally placed within a controller 1 and external determination resistors 13A, 13B, 13C, . . . , 13N are provided in addition to it. The external determination resistors 13A through 13N are all identical to each other in resistance value. One ends of the external determination resistors 13A through 13N are respectively electrically connected to pins Nos. 6 of unit mounting portions 2A through 2N, whereas the other ends thereof are respectively electrically connected to a decision voltage supply terminal of a controller 1 through a decision voltage supply line. Further, the pins Nos. 6 of the respective unit mounting portions 2A through 2N are respectively electrically connected to a second decision signal input terminal of the controller 1 through a second decision signal line bundle. The second decision signal input terminal is electrically connected to the analog-to-digital converter 1A.

In FIG. 3, the same elements of structure as those shown in FIG. 1 are identified by the same reference numerals and their description will be omitted.

As shown in FIGS. 4A through 4D, the control instruction units 14A, 14B, 14C and 14D employed in the second embodiment are one in which internal determination resistors 15A, 15B, 15C and 15D are respectively added to the control instruction units 4A through 4D employed in the first embodiment. The internal determination resistors 15A through 15D have resistance values different from one another according to the control instruction units 14A through 14D. One ends of the internal determination resistors 15A through 15D are electrically connected to their corresponding pin-receiving terminals Nos. 6 of the control instruction units 14A through 14D, whereas the other ends thereof are respectively electrically connected to pin-receiving terminal s Nos. 2.

Even in FIGS. 4A through 4D, the same elements of structure as those shown in FIGS. 2A through 2D are identified by like reference numerals and their description will be omitted.

Operations of the vehicle-equipment control apparatus according to the second embodiment, which is constructed as described above, will be described using FIG. 3 and FIGS. 4A through 4D.

However, in the operations of the vehicle-equipment control apparatus according to the second embodiment, operating forms of configurational portions common to the vehicle-equipment control apparatus according to the first embodiment are identical to those in the already-mentioned operations of the vehicle-equipment control apparatus according to the first embodiment. Therefore, only the operations peculiar to the vehicle-equipment control apparatus according to the second embodiment will be explained and the description of other operations will be omitted.

When a decision voltage (e.g., 5V) is supplied to the external determination resistor 13A from the decision voltage supply terminal of the controller 1 through the decision voltage supply line where one of the control instruction units 14A through 14D, e.g., the control instruction unit 14A is now fit to the unit mounting portion 2A, the decision voltage is fractionally divided by the external determination resistor 13A and the internal determination resistor 15A so that a divided voltage VD1 is produced at the pin No. 6 of the unit mounting portion 2A. The divided voltage VD1 obtained at this time is supplied to the second decision signal input terminal of the controller 1 through the second decision signal line bundle as a second decision signal, followed by conversion into a digital signal by the analog-to-digital converter 1A.

Further, when a decision voltage is supplied to the external determination resistor 13B from the decision voltage supply terminal of the controller 1 through the decision voltage supply line where one of the other control instruction units 14B through 14D, e.g., the control instruction unit 14B is fit to the unit mounting portion 2B, the decision voltage is fractionally divided by the external determination resistor 13B and the internal determination resistor 15B so that a divided voltage VD2 different from the divided voltage VD1 is generated at the pin No. 6 of the unit mounting portion 2B. The divided voltage VD2 obtained at this time is supplied to the second decision signal input terminal of the controller 1 through the second decision signal line bundle as a second decision signal, after which it is converted into a digital signal by the analog-to-digital converter 1A.

Similarly, when a decision voltage is supplied to the external determination resistor 13C from the decision voltage supply terminal of the controller 1 through the decision voltage supply line where one of another control instruction unit 14C or 14D, e.g., the control instruction unit 14C is fit to the unit mounting portion 2C, the decision voltage is fractionally divided by the external determination resistor 13C and the internal determination resistor 15C so that a divided voltage VD3 different from the divided voltages VD1 and VD2 is generated at the pin No. 6 of the unit mounting portion 2C. The divided voltage VD3 obtained at this time is supplied to the second decision signal input terminal of the controller 1 through the second decision signal line bundle as a second decision signal, after which it is converted into a digital signal by the analog-to-digital converter 1A.

Further, when a decision voltage is supplied to the external determination resistor 13C from the decision voltage supply terminal of the controller 1 through the decision voltage supply line where the other control instruction unit 14D is fit to the unit mounting portion 2D, the decision voltage is fractionally divided by the external determination resistor 13D and the internal determination resistor 15D so that a divided voltage VD4 different from the divided voltages VD1, VD2 and vD3 is generated at the pin No. 6 of the unit mounting portion 2D. The divided voltage VD4 obtained at this time is supplied to the second decision signal input terminal of the controller 1 through the second decision signal line bundle as a second decision signal, after which it is converted into a digital signal by the analog-to-digital converter 1A.

According to the second embodiment as described above, if the desired control instruction units 14A through 14D are respectively electrically connected to the unit mounting portions 2A through 2N, identification can immediately be made as to whether the control instruction units 14A through 14D mounted to the unit mounting portions 2A through 2N correspond to any of a plurality of types of control instruction units 14A through 14D, by determining, when the unit mounting portions 2A through 2N are scanned, from which pin numbers of the scanned unit mounting portions 2A through 2N the decision signals are supplied and by determining the values of the second decision signals supplied from the unit mounting portions 2A through 2N.

Since the decision processing is effected on the decision signal by the digital method during the identification as to the plurality of types of control instruction units 14A through 14D and the second decision signal is converted from analog form to digital form and thereafter subjected to determining processing by the digital method in the same manner as described above in the second embodiment, the processing speed at the determination of the control instruction units 14A through 14D can be made fast by a rate at which analog-to-digital conversion is not performed on the whole decision signal, as compared with the previously-proposed vehicle-equipment control apparatus. Further, a circuit resistant to noise can be configured. Moreover, since the control instruction units 14A through 14D use the diode-connected circuits using the two or more diodes and one resistor at determining portions thereof, the control instruction units 14A through 14D become simple in their circuit design and hence they make s no use of incorrect devices and are not miswired upon their assembly.

Incidentally, the aforementioned first and second embodiments have been described by the examples in which the control instruction units 4A through 4D and 14A through 14D are four types, respectively. However, the control instruction units 4A through 4D and 14A through 14D employed in the present invention are not limited to the four types. It is needless to say that the present invent ion can be applied to the four or more types of control instruction units by suitably changing the diode-connected circuits. In the second embodiment in particular, many kinds of control instruction units can be obtained by sharing the use of a determination circuit in which a change in connection and placement of a diode has been made and a second determination circuit in which a change in the resistance value of an internal determination circuit has been made.

According to the present invention as has been described above, the functions of control instruction units are discriminated from one another by using diode-connected circuits respectively corresponding to functions and types of control instruction units incorporated into and placed in the control instruction units sides and a control instruction unit determinator for determining the types of the control instruction units based on outputs of the diode-connected circuits of the mounted control instruction units placed on the control apparatus side. The diode-connected circuits are simply provided on the control instruction units sides and the outputs of the diode-connected circuits are merely determined on the control apparatus side. Therefore, an effect is brought about in that upon implementing the control instruction units, they are simple in their circuit design and further they make no use of incorrect devices and are not miswired upon their assembly, and since digital processing is principally used to make determination as to the output of each diode-connected circuit in the control instruction units, a determining process becomes fast and a determining process resistant to noise can be performed.

What is claimed is:

1. A vehicle-equipment control apparatus, comprising:

a plurality of types of control instruction units respectively having different switch functions and incorporating different diode-connected circuits therein, said diode-connected circuits having a plurality of pins and at least one diode, each diode connecting at least two of the plurality of pins, said diode-connected circuits having a unique combination of a number of diodes and an arrangement of connections between the plurality of pins using the number of diodes;

unit mounting portions to which said plurality of types of control instruction units are fittable; and a control instruction unit determinator to determine, when any of said plurality of types of control instruction units is fit to the unit mounting portions, the type of said control instruction unit based on a digital signal output of said plurality of pins of said each diode-connected circuit.

2. The vehicle-equipment control apparatus according to claim 1, said each diode-connected circuit further comprising a resistor.

* * * * *